(12) United States Patent
Kahn et al.

(10) Patent No.: US 7,177,990 B1
(45) Date of Patent: Feb. 13, 2007

(54) AUTOMATIC FORMAT OF REMOVABLE MEDIA

(75) Inventors: Jessica L. Kahn, Boulder, CO (US); Dennis M. Summers, Port Orchard, WA (US); Mark A. Green, Berthoud, CO (US); David A. Coleman, Silverdale, WA (US); Gregory P. Fry, Portland, OR (US); Carl Fry, Portland, OR (US)

(73) Assignee: Sonic Solutions, Novato, CA (US)

( * ) Notice: Subject to any disclaimer, the term of this patent is extended or adjusted under 35 U.S.C. 154(b) by 150 days.

(21) Appl. No.: 10/210,824

(22) Filed: Jul. 31, 2002

Related U.S. Application Data (60) Provisional application No. 60/382,495, filed on May 21, 2002.

(51) Int. Cl.
*G06F 12/00* (2006.01)
(52) U.S. Cl. ............... 711/154; 711/111; 369/30.04
(58) Field of Classification Search ............... 711/171, 711/172, 173, 4, 154, 111; 369/59.25
See application file for complete search history.

(56) References Cited

U.S. PATENT DOCUMENTS

| | | | | |
|---|---|---|---|---|
| 6,134,204 | A * | 10/2000 | Taugher | 369/59.25 |
| 6,172,955 | B1 * | 1/2001 | Hashimoto | 369/53.37 |
| 6,542,975 | B1 * | 4/2003 | Evers et al. | 711/162 |
| 6,606,285 | B1 * | 8/2003 | Ijtsma et al. | 369/47.1 |
| 6,813,648 | B1 * | 11/2004 | Perona et al. | 710/8 |
| 6,904,008 | B2 * | 6/2005 | Kawashima et al. | 369/47.15 |
| 2002/0051019 | A1 * | 5/2002 | De Vorchik et al. | 345/835 |
| 2002/0080392 | A1 * | 6/2002 | Parvulescu et al. | 358/1.15 |
| 2002/0138512 | A1 * | 9/2002 | Buresh et al. | 707/507 |
| 2002/0159353 | A1 * | 10/2002 | Sasaki | 369/53.15 |
| 2002/0172123 | A1 * | 11/2002 | Ohmi | 369/59.25 |
| 2003/0013951 | A1 * | 1/2003 | Stefanescu et al. | 600/407 |

OTHER PUBLICATIONS

"Microsoft PressPass—Fast Facts about Microsoft," Microsoft, 2004, www.microsoft.com/presspass/inside_ms.asp, pp. 4.*
"Using and Configuring AutpPlay," Microsoft, 2004, (see Office action for URL).*
"Preparing Hardware and Software for Use with AutoPlay," Microsoft, 2004, (see Office action for URL).*

(Continued)

*Primary Examiner*—Pierre Bataille
*Assistant Examiner*—Shane M. Thomas
(74) *Attorney, Agent, or Firm*—Martine Penilla & Gencarella, LLP (57) ABSTRACT

An invention is disclosed for automatically preparing removable media for content, such as by automatically formatting media such as CDs and DVDs. A drive type is determined for a drive present on a computer system. The drive type defines characteristics of the drive. In addition, a media type is detected for removable media, such as a compact disc or floppy disk, present in the drive. Similar to the drive type, the media type defines characteristics of the removable media. Based on the drive type and media type, the removable media is automatically prepared for content in response to receiving a request to write to the removable media.

9 Claims, 7 Drawing Sheets

OTHER PUBLICATIONS

"SuperDisk User's Guide," Imation, 1999, (see Office action for URL).*
"New Enhanced Feature Make Nero the Ideal Choice for Casual and Advnaced Users," Ahead Software, 2001, (see Office action for URL).*
"Nero Burning Rom 5.5 Manual," Ahead Software, 2001, (see Office action for URL).*
"Break-down on How to Read the Nero Log File Sample 1," Ahead Software, Jun. 2002, (see Office action for URL).*
"Nero 5 Burning ROM: Brief Instructions," Ahead Software, 2001, (see Office action for URL).*
MKFP, Panagiotis Christias, 1994.*
"Formatted and Unformatted Capacity," The PC Guide, Apr. 2001, (see Office action for URL).*
"Floppy Disk Geometry," The PC Guide, Apr. 2001, (see Office action for URL).*
"File Handling in Windows 3.1," NOS : Certificate in Computer Applications, http://wwwnos.org/htm/os3.htm.*
"Windows 3.x," Wikipedia, http://en.wikipedia.org/wiki/Windows_3.x.*
Winzip Screen Shot, http://www.nos.org/htm/course.htm, "Operating Systems" link.*
"Floppy Driver Puts Pedal to the Metal in Disk-Format Process," PC Week, vol. 5, No. 12, Mar. 22, 1988, p. 84.*
XUpLOAD 2.1 Programmer's Manual, http://www.aspupload.com/xupload/xmanual.htm, 2001.
McFadden, Andy "CD-Recordable FAQ—Section 1," www.cdrfaq.org/faq01.htm#s1-8, 2001.
"Introduction—Phillips Intellectual Property & Standards," Phillips, http://www.mt-rainier.org.
Case, Loyd, "No More Floppies?," http://www.findarticles.com/p/articles/mi_zd4166/is_200212/ai_n9513770/print.

* cited by examiner

AUTOMATIC FORMAT OF REMOVABLE MEDIA

CROSS REFERENCE TO RELATED APPLICATIONS

This application claims the benefit of U.S. Provisional Patent Application No. 60/382,495, filed on May 21, 2002, entitled "Automatic Format of Removable Media." This application is related to 1) U.S. patent application Ser. No. 10/143,285, filed on May 9, 2002, entitled "Method and Apparatus for Formatting and Initialization of Rewritable Optical Media," and 2) U.S. patent application Ser. No. 10/193,422, filed Jul. 10, 2002, entitled "Method and Apparatus for Formatting and Initialization of Re-Writable Optical Media Using Multiple Tracks." All three of these patent applications are hereby incorporated by reference.

BACKGROUND OF THE INVENTION

1. Field of the Invention

This invention relates generally to computer readable removable media management, and more particularly to automatic preparation of computer readable removable media for content.

2. Description of the Related Art

Currently, computer readable removable media, such as floppy disks, CDs, and DVDs, requires preparation before being capable of storing data. Generally, this preparation takes the form of formatting the removable media. Broadly speaking, formatting organizes and divides the media into pieces that can be controlled for convenient storage and access. For example, a disk may be formatted into sectors, tracks, and clusters, which can be accessed via the operating system.

Figure 1:
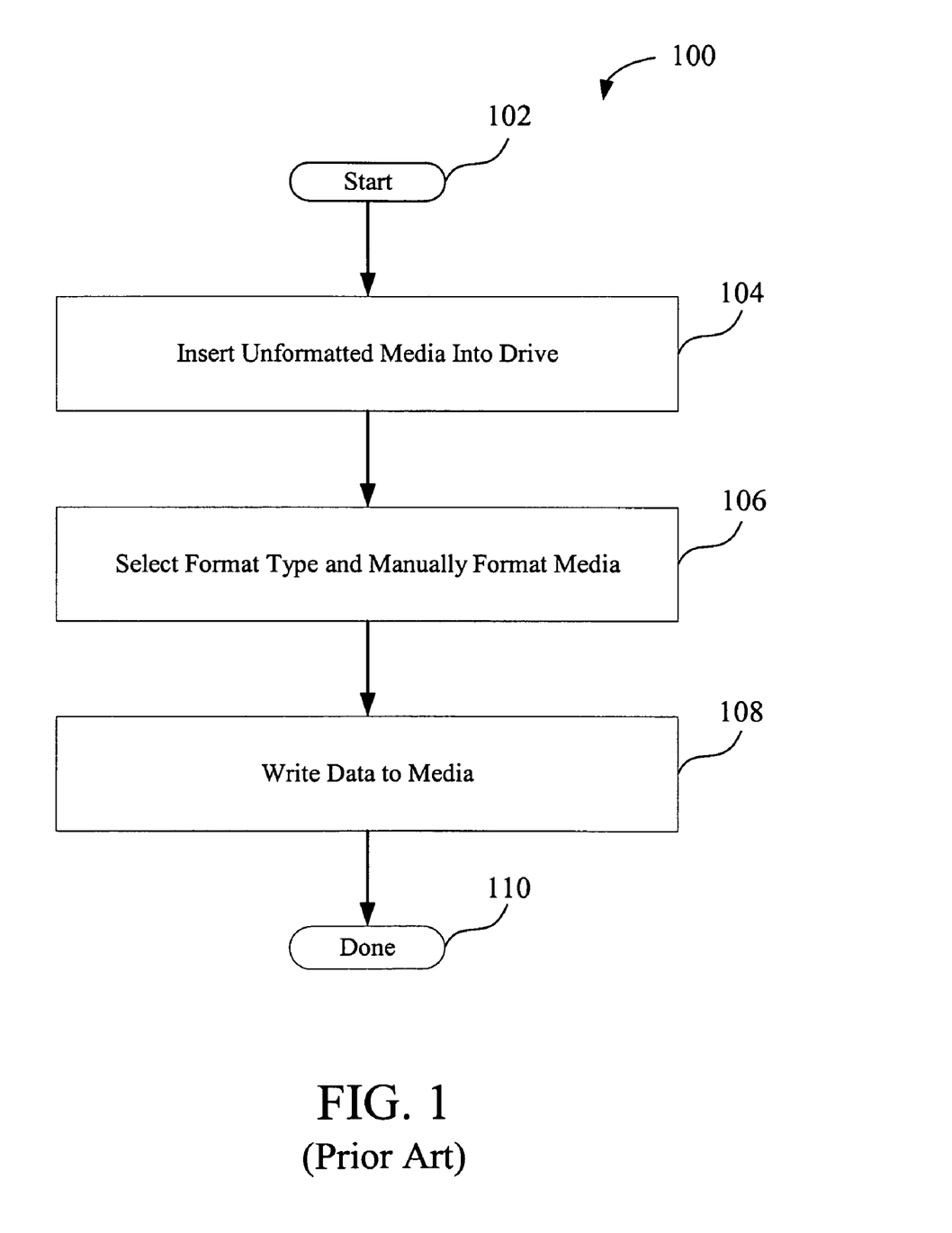
FIG. 1 is a flowchart showing a method conventionally used to prepare removable media for accepting data.

Although floppy disks generally are available preformatted, most other computer readable removable media, such as optical media, still require the user to perform a manual format. For example, FIG. 1 is a flowchart showing a method 100 conventionally used to prepare removable media for accepting data. In an initial operation 102, preprocess operations are performed. Preprocess operations can include, for example, selecting an appropriate storage media, preparing data to write to the storage media, and other preprocess operations that will be apparent to those skilled in the art.

In operation 104, the user inserts the unformatted media into the appropriate drive. For example, when writing a large amount of data, a user can select a blank, unformatted CD and insert the unformatted CD into the CD drive. Upon closing the drive, and with appropriate CD management software installed, the computer system generally will recognize the CD is unformatted and prompt the user to format the CD.

Figure 2:
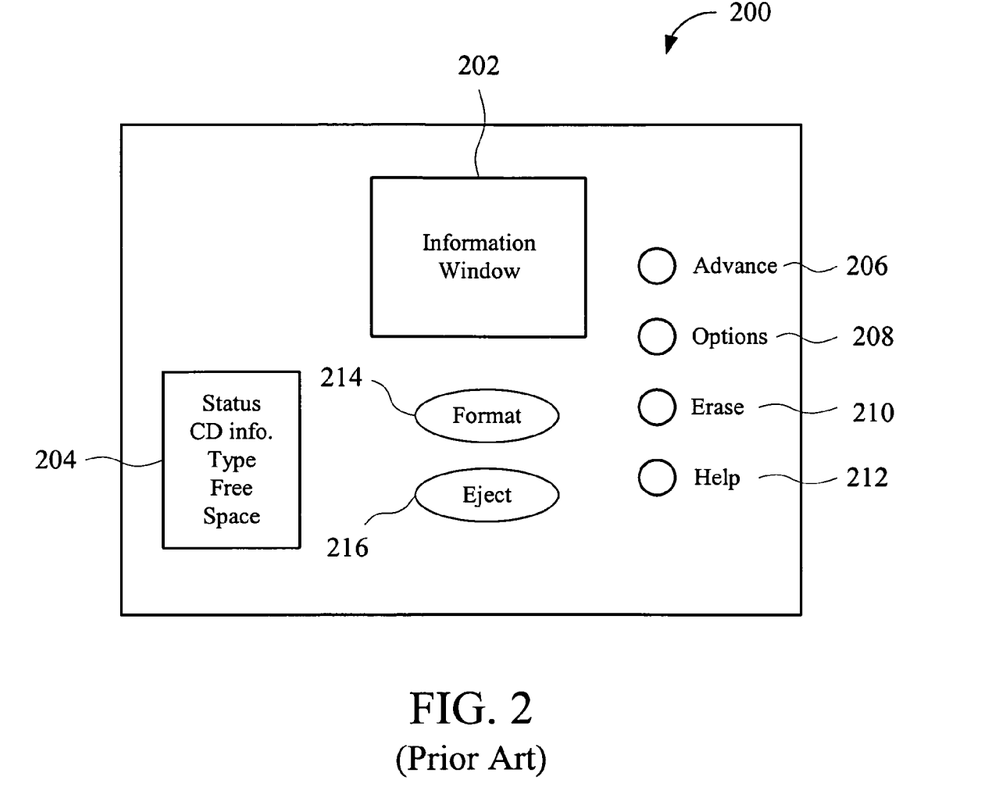
FIG. 2 illustrates an exemplary conventional CD format utility.

In operation 106, the user selects a format type and manually formats the removable media. For example, FIG. 2 illustrates an exemplary conventional CD format utility 200. The conventional CD format utility 200 includes an information window 202, a CD status window 204, a plurality of function buttons 206–212, a format button 214, and an eject button 216. In operation, the status of the CD is shown in the status window 204. For example, the status window 204 can show the type of CD inserted into the CD drive, and the amount of free space left on the CD. The user can utilize the option button 208 to select an appropriate format type for the CD. Once the type of format is selected, or default set, the format button 214 can be used to format the CD.

In another example, a user can select a format button on the main screen and be presented with a dialog box containing various formatting choices. The user then selects a format type, clicks the Start Format button, and formatting commences. After a period of time the CD formatting operation will be complete and the user will be informed of the format status in the information window 202.

Referring back to FIG. 1, once the user has formatted the media, the user can write data to the media, in operation 108. Generally, a user will write to the media using a drag and drop method, or cut and paste method. When using a drag and drop method, the user selects a file using the mouse cursor and the left or right mouse button. While keeping the mouse button depressed, the user drags the icon for the file to the drive icon for the media or an open window for the drive. When the user releases the mouse button the file is written to the formatted media in the drive.

Optionally, the operating system may allow the user to select how the data is written to the media. For example, the user may be able to select whether the data should be moved to the removable media (and erased from its current location) or only copied to the removable media. Post process operations are performed in operation 110. Post process operations can include updating directory viewing applications to show the newly copied data on the media, and other post process operations that will be apparent to those skilled in the art.

Unfortunately, many new computer users are unfamiliar with formatting requirements. As such, users may have difficulty in selecting an appropriate type of format for a particular removable media, or may not format the media before attempting to write to the unformatted media. As a result, many users experience errors, data loss, and frustration when using unformatted computer readable removable media.

In view of the foregoing, there is a need for systems and methods for allowing a user to utilize blank unformatted removable media without manually formatting the media. The methods should allow users to access and use removable media, such as CDs and DVDs, in a manner similar to using pre-formatted removable media, such as pre-formatted floppy disks.

SUMMARY OF THE INVENTION

Broadly speaking, embodiments of the present invention fill these needs by automatically preparing removable media for content, such as by automatically formatting media such as CDs and DVDs. Hence, embodiments of the present invention can automatically format removable media transparently, without user intervention, thus hiding the format operation from the user. In one embodiment, a method is disclosed for automatically formatting removable media. A drive type is determined for a drive present on a computer system. The drive type defines characteristics of the drive. In addition, a media type is detected for removable media, such as a compact disc or floppy disk, present in the drive. Similar to the drive type, the media type defines characteristics of the removable media. Based on the drive type and media type, the removable media is automatically prepared for content in response to receiving a request to write to the removable media. For example, a format type can be determined based on the drive type and the media type. As above, format type can define a particular formatting process for formatting removable media. The removable media can then be formatted based on the format type. Once the removable media is formatted, the write request can be allowed to continue.

A further method for automatically formatting removable media is disclosed in an additional embodiment of the present invention. A drive type is determined for a drive present on a computer system. As above, drive type defines characteristics of the drive. A media type is also detected for removable media, such as a compact disc or floppy disk, present in the drive. Similar to the drive type, the media type defines characteristics of the removable media. In addition, a request to write data to the removable media is analyzed to determine a data type, which defines characteristics of the data. Based on the drive type, media type, and the data type, the removable media is automatically prepared for content in response to receiving the request to write to the removable media. Optionally, a specialty program can be launched to prepare the removable media for content, and a user can optionally be prompted for confirmation to launch the specialty program. For example, a music CD creation specialty program can be launched when the data type is a music file type. As above, after preparing the removable media for content, the write request can be allowed to continue.

A computer program embodied on a computer readable media for automatically preparing removable media for content is disclosed in a further embodiment of the present invention. The computer program includes a code segment for determining a drive type of a drive present on a computer system. As above, the drive type defines characteristics of the drive. In addition, a code segment is included for detecting a media type of removable media present in the drive, where the media type defines characteristics of the removable media. The computer program further includes a code segment for automatically preparing the removable media for content based on the drive type and media type in response to receiving a request to write to the removable media. Optionally, the computer program can include a code segment that determines a format type, which defines a particular formatting process, based on the drive type and the media type. The format type can then be passed to a code segment that formats the removable media based on the format type. In addition, the computer program can include a code segment that passes the write request to an operating system after formatting the removable media. Similar to above, a code segment can be included that launches a specialty program to prepare the removable media for content. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for automatically preparing removable media for content, such as by automatically formatting media such as CDs and DVDs. Embodiments of the present invention allow users to access and use unformatted removable media in a manner similar to that used when accessing and using pre-formatted removable media. Broadly speaking, embodiments of the present invention automatically format removable media transparently, without user intervention, thus hiding the format operation from the user. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

The majority of users of removable media generally, do not have a preference as to the type of formatting performed on removable media they are using. For example, a typical user of a CD-R generally is not concerned with how the CD-R is formatted. This user typically wishes to write and read files to and from the CD-R, regardless of the manner in which the CD-R is prepared. Hence, embodiments of the present invention automatically prepare removable media for content. For example, using the embodiments of the present invention, a user can write to an unformatted CD-R without manually formatting the CD-R prior to writing to the disc. The embodiments of the present invention automatically prepare the disc for content. In particular, embodiments of the present invention intelligently select an appropriate format type for removable media in a drive, and as the user attempts to save files to the media, embodiments of the preset invention automatically format the media prior to writing the data to the media. As used herein, the term "formatting" describes the preparatory functions that program the file system structures required to define a file system on RW media, and the term "initialization" describes those processes that prepare the user data partition. In addition, the terms "track" and "session," as they apply to CD optical media and as used herein, also are equivalent to the concepts of "zone" and "border" as they apply to DVD optical media.

Figure 3:
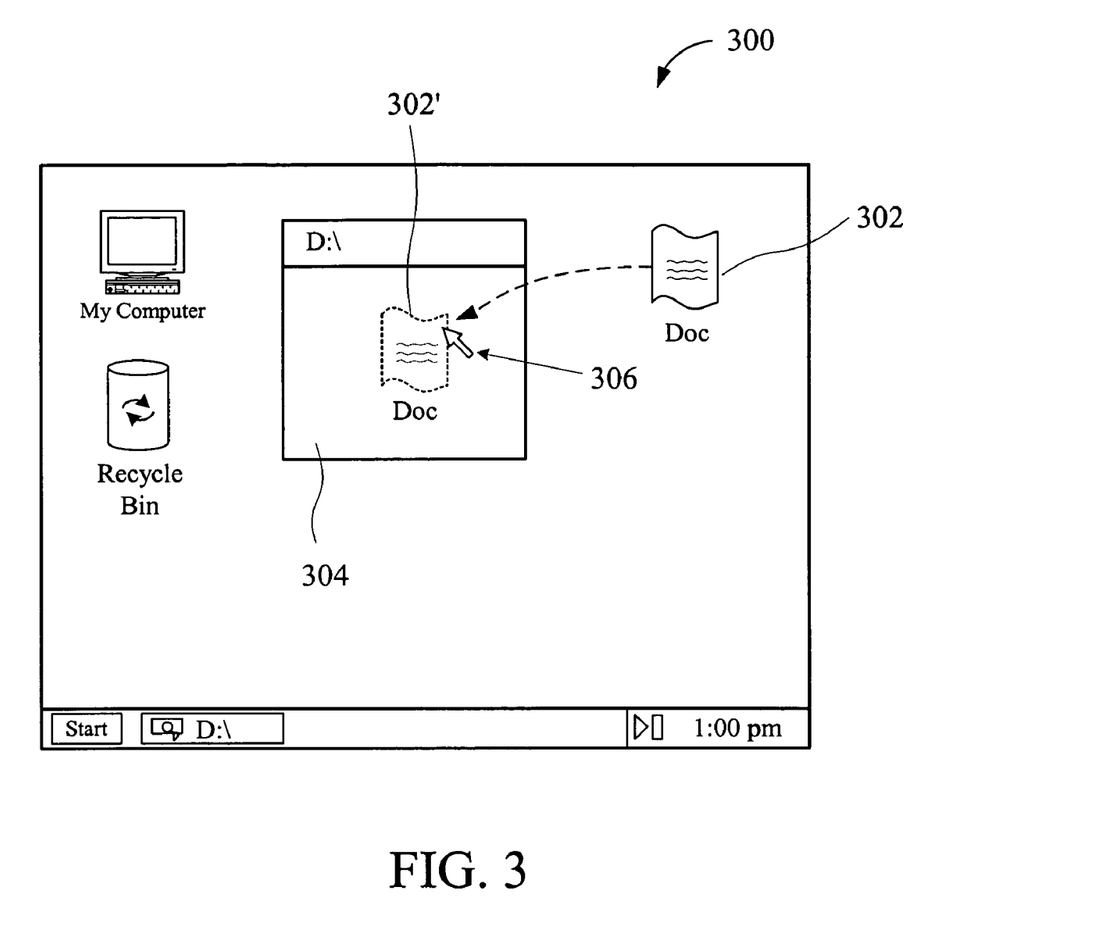
FIG. 3 illustrates an exemplary computer screen view showing a user initiated save to an unformatted removable media, in accordance with an embodiment of the present invention.

FIG. 3 illustrates an exemplary computer screen view 300 showing a user initiated save to an unformatted removable media, in accordance with an embodiment of the present invention. FIG. 3 illustrates the ease with which a user can utilize unformatted removable media via the embodiments of the present invention. Hence, a user can open a window 304 to a drive having unformatted removable media. For example, in FIG. 3, the user can open a window to a CD-R/RW drive containing an unformatted CD-R. In addition, the user can select a file 302 to save to the media using the mouse cursor 306. Generally, to save the file to the media, the user drags the icon representing the file 302 to the window 304 and releases the mouse button.

At this point, embodiments of the present invention recognize the user is attempting to write to unformatted media, such as the unformatted CD-R. In response, the CD-R is formatted prior to performing the write operation. Advantageously, this format is performed automatically, without user intervention, and generally without any indication to the user that the CD is being formatted. Once the CD is formatted, the write operation is allowed to continue, and file 302' is written to the CD.

It should be noted that the user can write content to media in several different manners. For example, in FIG. 3, the user can select the icon representing the file 302 and press the right mouse button. In this case, a menu generally will appear that allows the user to select from several different operations related to the selected file 302. One of these operations can be a "send to" operation, which allows a user to select a particular drive one which to write the selected file 302. Other exemplary file writing techniques include using a "windows explorer" program to transfer the file to the unformatted media, and "dragging" the file to a drive icon.

When using a "windows explorer" program, for example, the user generally selects a folder having the file 302 from a list of folders displayed in a left frame of the windows explorer user interface. The contents of the selected folder are then displayed in a right frame of the windows explorer user interface. The user can "drag" the icon representing the file 302 from the right frame to the desired media drive icon in the left frame to save the file 302.

When "dragging" the file to a drive icon, the user selects a file 302 to save to the media using the mouse cursor 306. Then, to save the file to the media, the user drags the icon representing the file 302 to the drive icon and releases the mouse button. Other techniques for writing a file to removable media exist and are dependent on the operating system environment utilized by the computer system. As such, it should be appreciated that the embodiments of the present can be utilized in conjunction with any technique utilized to interact with removable media.

As mentioned above, several different types of formatting may be possible with any particular removable media. For example, a CD-RW can be, for example, formatted using a quick format, a full format, or one of several other format types. To determine the type of format to utilize when automatically formatting the removable media, embodiments of the present invention examine the media type and state, and the corresponding drive.

Figure 4:
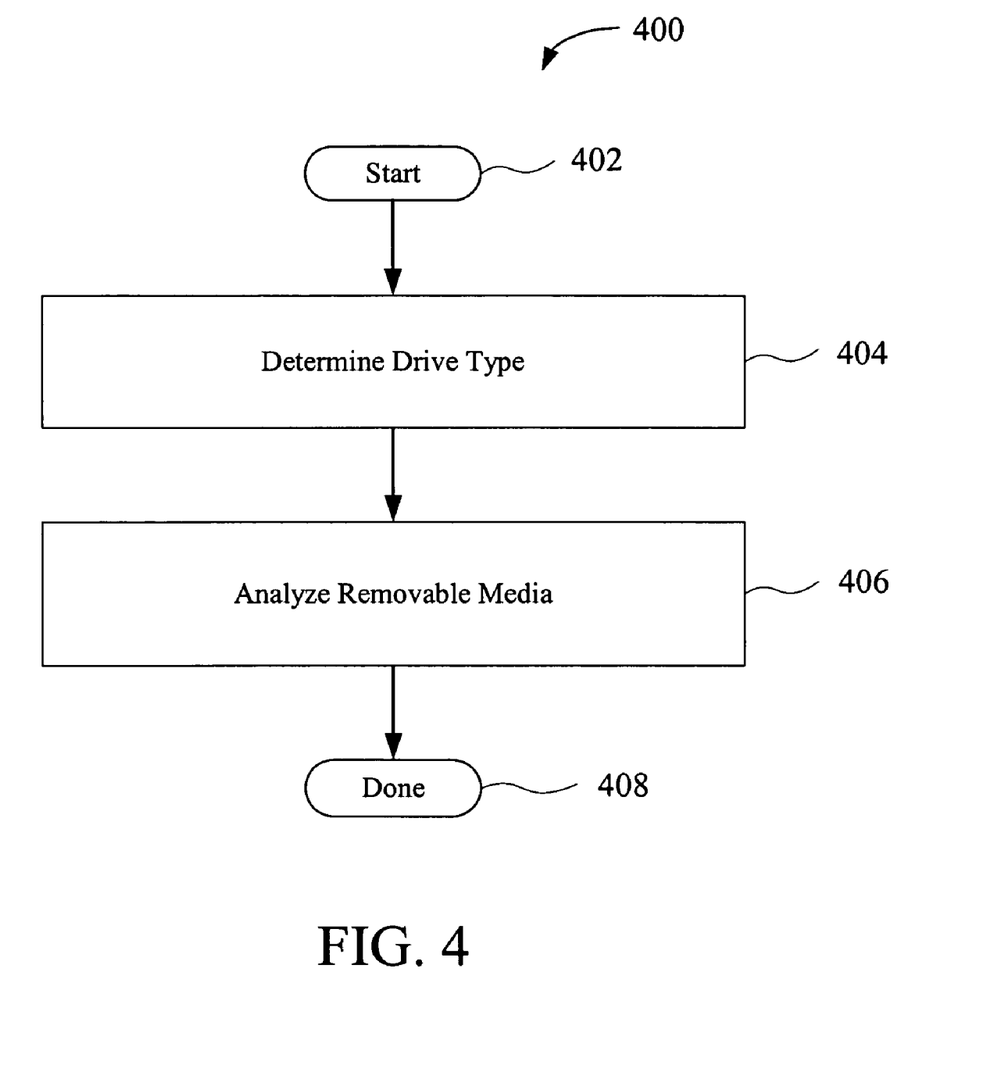
FIG. 4 is a flowchart showing a method for automatically determining an appropriate format type for a removable media, in accordance with an embodiment of the present invention.

FIG. 4 is a flowchart showing a method 400 for automatically determining an appropriate format type for a removable media, in accordance with an embodiment of the present invention. In operation 402, preprocess operations are performed. Preprocess operations can include, for example, determining the number and location of removable media drives in the system, sensing when new media is inserted in a drive, and other preprocess operations that will be apparent to those skilled in the art after a careful reading of the present disclosure.

Figure 5:
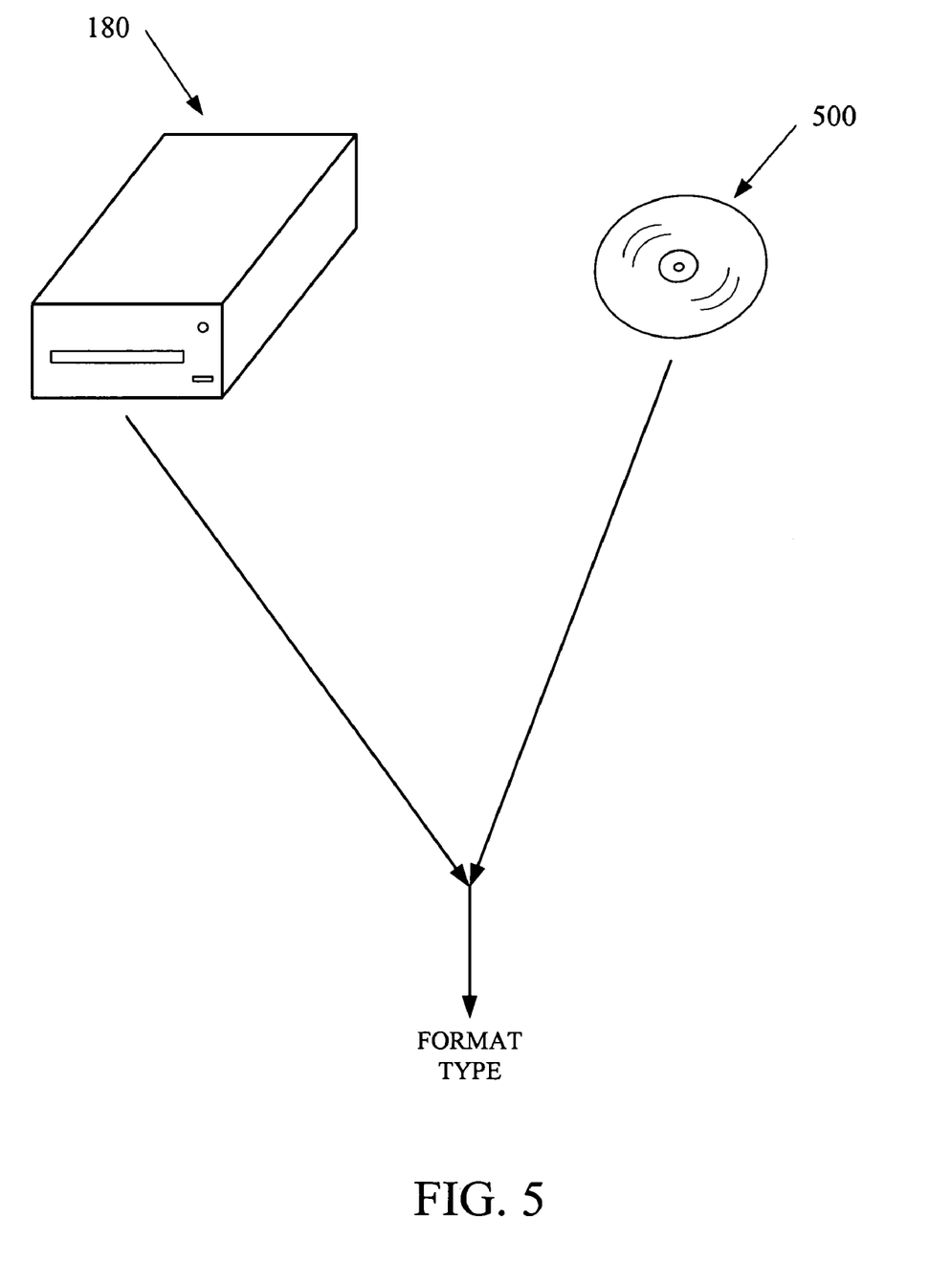
FIG. 5 is a diagram illustrating the sources utilized by the embodiments of the present invention to determine format type, in accordance with an embodiment of the present invention.

In operation 404, the drive containing the removable media is analyzed to determine the drive type. FIG. 5 is a diagram illustrating the sources utilized by the embodiments of the present invention to determine format type, in accordance with an embodiment of the present invention. As shown in FIG. 5, embodiments of the present invention examine the media 500 and the drive 502 containing the media 500 to determine format type. When examining the drive 502, embodiments of the present invention analyze the properties of the drive 502, such as the manufacturer and model number, to determine the capabilities of the drive 502.

Different drive types can have different capabilities, and thus, may support varying format types. For example, specific drives manufactured by Hewlett-Packard allow a format type called "fastformat," which provides fast formatting. Similarly, a Mount Rainier Drive, for example, allows Mount Rainier formatting, which performs an initial format then allows the user to interact with the drive while the remainder of the formatting continues. Other drive manufactures can support still further formatting types. Hence, the embodiments of the present invention examine the drive type to determine the format types supported by the drive.

Referring back to FIG. 4, the removable media present in the drive is analyzed, in operation 406. As shown in FIG. 5, and mentioned above, embodiments of the present invention examine the media 500 and the drive 502 containing the media 500 to determine format type. When examining the media 500, embodiments of the present invention determine the type of media and the state of the media. The type of media determines the format types that can be utilized to format the media. For example, a floppy disk can be formatted using different format types than are available when formatting a CD-R. In addition, the state of the media can influence the format type selected for the media. For example, a previously formatted CD-RW can be formatted using a quick format or a full format. The quick format does not erase the entire disc, but allows it to be overwritten during use, while a full format erases the entire disc, but generally requires additional time to perform. Once the format type is selected, the removable media can be formatted when the user attempts to interact with the media.

Turning back to FIG. 4, post process operations are performed in operation 408. Post process operations can include detecting when new media is inserted in the drive, allowing a user to manually format the media, formatting the media in response to receiving a user request to write to the media, and other post process operations that will be apparent to those skilled in the art after a careful reading of the present disclosure. Hence, by analyzing the drive and media, embodiments of the present invention can automatically format unformatted media without requiring user intervention, as described below with reference to FIG. 6.

Figure 6:
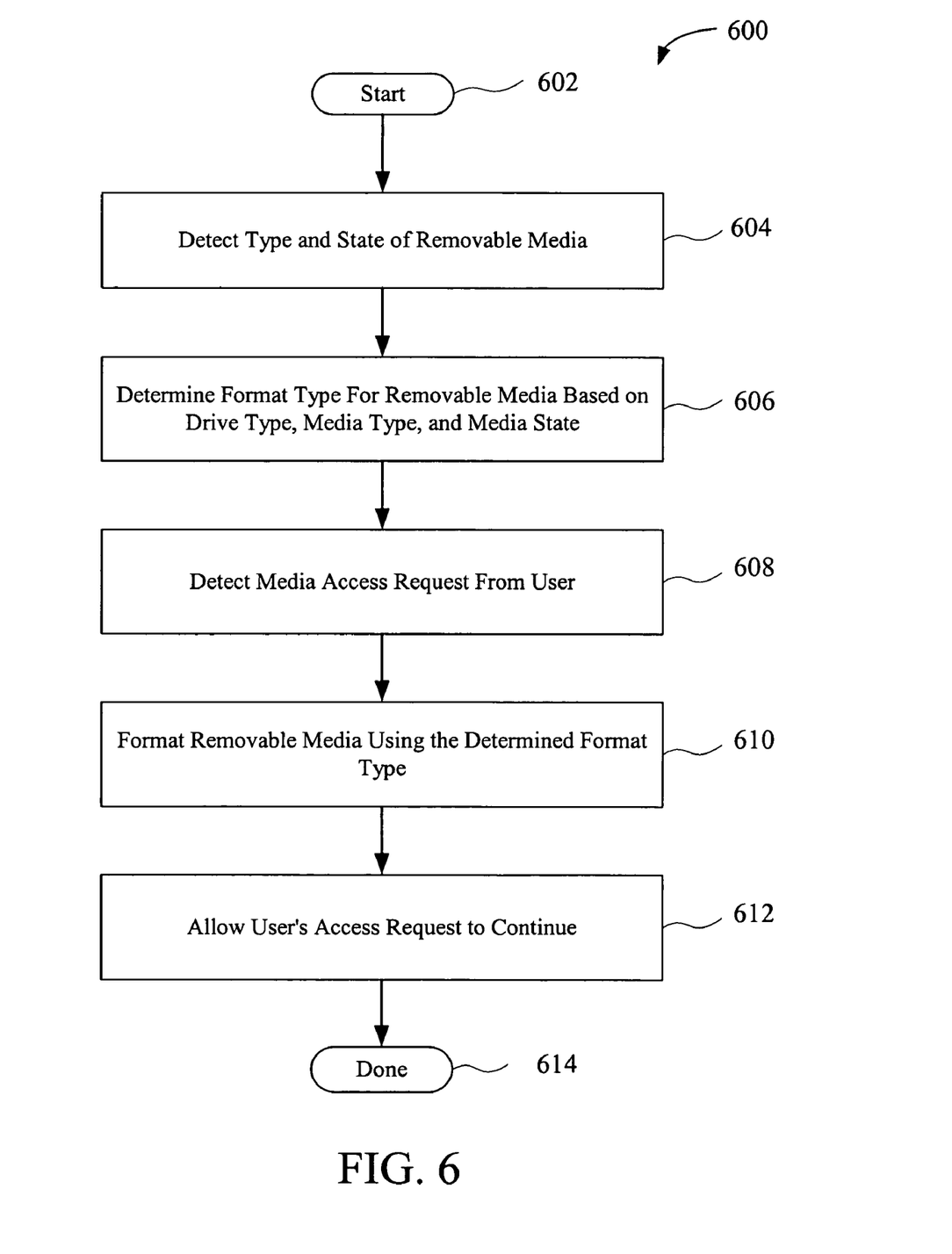
FIG. 6 is a flowchart showing a method for automatically preparing removable media for content, in accordance with an embodiment of the present invention.

FIG. 6 is a flowchart showing a method 600 for automatically preparing removable media for content, in accordance with an embodiment of the present invention. In an initial operation 602, preprocess operations are performed. Preprocess operations can include, for example, determining the drive type of the drive containing the removable media, detecting the presence of new removable media in the drive, and other preprocess operations that will be apparent to those skilled in the art after a careful reading of the present disclosure.

In operation 604, the type and state of the removable media is detected. As mentioned above, embodiments of the present invention examine the media and the drive containing the media to determine format type. When examining the media, embodiments of the present invention determine the type of media and the state of the media. As mentioned previously, the type of media determines the format types that can be utilized to format the media. In addition, the state of the media can influence the format type selected for the media. For example, a previously formatted CD-RW can be formatted using a quick format or a full format. The quick format does not erase the entire disc, but allows it to be overwritten during use, while a full format erases the entire disc, but generally requires additional time to perform.

Based on the drive type, media type, and media state, a format type is determined for the removable media, in operation 606. As will be described subsequently, embodiments of the present invention can prepare media for receiving content in response to a user's attempt to write to such media. To reduce the amount of processing required at the time of formatting, embodiments of the present invention can determine the type of format that will be used for a particular unformatted media in a particular drive prior to receiving a request to access the media. In this manner, the format type will be previously determined when the actual format is performed, thus saving time during the format operation. However, it should be noted that embodiments of the present invention are not limited to determining the format type prior to receiving a user request to access the media, and can thus determine the format type at any time prior to actually formatting the media.

For example, tables 1–3 below show exemplary format type selections based on the type of media and the type of drive. In particular, table 1 illustrates exemplary format type selections for unformatted media when used with a standard drive, and a Mount Rainier Drive.

TABLE 1

| Media | Standard Drive | Description | Mount Rainier Drive |
|---|---|---|---|
| CD-R | Quick Format | File system written to disc | N/A |
| CD-RW | Quick Format as CD-R | File system written to disc | Mount Rainier Format |
| DVD-RAM | Quick Format | Block structure already on disc; file system written | N/A |
| DVD-R | Quick Format | Like CD-R; file system written to disc | N/A |
| DVD-RW | Quick Format | Drives contain the ability to simulate a built in background formatting, file system written to disc. | N/A |
| DVD+RW | Quick Format | Drives contain built-in background formatting; file system written to disc | Mount Rainier format |
| DVD+R | Like CD-R/DVD-R | | N/A |

Table 2 illustrates exemplary format type selections for previously written media when the media is mounted using software known by the developer, and when used with a standard drive, and a Mount Rainier Drive, in accordance with an embodiment of the present invention.

TABLE 2

| Media | Standard Drive | Description | Mount Rainier Drive |
|---|---|---|---|
| CD-R | N/A | Can't re-format CD-R | N/A |
| CD-RW | Quick format | Do a quick format on previously written CD-RW. | Mount Rainier Format: if MR disc, do a quick MR format. If a mounted non-MR format, do a quick format. |
| DVD- | Quick Format. | | N/A |

TABLE 2-continued

| Media | Standard Drive | Description | Mount Rainier Drive |
|---|---|---|---|
| RAM | Ready for reading and writing | | |
| DVD-R | N/A | Can't re-format DVD-R | N/A |
| DVD-RW | Quick format | Drives contain the ability to simulate a built in background formatting, file system written to disc. | N/A |
| DVD+RW | Quick Format | Drives contain built-in background formatting; file system written to disc | Mount Rainier format if a MR disc, otherwise, full format. |
| DVD+R | N/A | Can't re-format DVD+R | N/A |

Table 3, below, illustrates exemplary format type selections for previously written media when the media is mounted using software unknown by the developer, and when used with a standard drive, and a Mount Rainier Drive, in accordance with an embodiment of the present invention.

TABLE 3

| Media | Standard Drive | Description | Mount Rainier Drive |
|---|---|---|---|
| CD-R | N/A | Can't re-format CD-R | N/A |
| CD-RW | Full Format | Minimally blank the disc, do a full format. | Mount Rainier Format: if MR disc, do a quick MR format. If a mounted non-MR format, do a quick format. |
| DVD-RAM | Quick Format | Rewrites file system | N/A |
| DVD-R | N/A | Can't re-format DVD-R | N/A |
| DVD-RW | Quick Format | Drives contain the ability to simulate a built in background formatting, file system written to disc. | N/A |
| DVD+RW | Quick Format | Drives contain built-in background formatting; file system written to disc | Mount Rainier format if a MR disc, otherwise, full format. |
| DVD+R | N/A | Can't re-format DVD+R | N/A |

In operation 608, a media access request from the user is detected. As mentioned previously, a user can request access to media using a plurality of different techniques. For example, the user can select a file to save to the media using the mouse cursor. Then, drag the icon representing the file to the window for the drive while keeping the mouse button depressed. Finally, the user releases the mouse button to save the file to the media. In addition, the user can select the icon representing the file and press the right mouse button. In this case, a menu will generally appear that allows the user to select from several different operations related to the selected file. One of these operations can be a "send to" operation, which allows a user to select a particular drive one which to write the selected file.

Other exemplary file writing techniques include using a "windows explorer" program to transfer the file to the unformatted media, and "dragging" the file to a drive icon. As discussed previously, when using a "windows explorer" program, for example, the user generally selects a folder having the file from a list of folders displayed in a left frame of the windows explorer user interface. The contents of the selected folder are then displayed in a right frame of the windows explorer user interface. The user can "drag" the icon representing the file from the right frame to the desired media drive icon in the left frame to save the file.

When "dragging" the file to a drive icon, the user selects a file to save to the media using the mouse cursor, and drags the icon representing the file to the drive icon. The user then releases the mouse button to save the file to the media. Other techniques for writing a file to removable media exist and are dependent on the operating system environment utilized by the computer system. As such, it should be appreciated that the embodiments of the present can be utilized in conjunction with any technique utilized to interact with removable media.

Regardless of the technique the user utilizes to request access to the media, embodiments of the present invention can detect this request. For example, embodiments of the present invention can "listen" for an interrupt that indicates a user is trying to access the media. In a further embodiment, drive access requests can be intercepted. Regardless of the manner in which the access request is detected, embodiments of the present invention format the removable media in response to detecting the media access request, as described in operation 610.

In operation 610, the removable media is formatted using the format type determined in operation 606. As mentioned above, embodiments of the present invention can utilize several formatting types to format a particular removable media as described above, with reference to Tables 1–3. For example, to reduce the amount of time required to format CD-RWs, embodiments can format CD-RWs using several techniques that reduce the formatting time. In one embodiment, for example, a CD-RW can be formatted as a CD-R, by performing a sequential format. In this case, the formatting time for the CD-RW is about that of a CD-R. Although, the versatility of the CD-RW can be reduced when formatted in this manner, the timesavings can compensate the lost versatility for some users.

In a further embodiment, fast formatting can be used when formatting a re-writable media. In this embodiment, the formatting includes placing UDF structures on the media to define the media as a UDF disc. The UDF file system is the generally accepted file system for data files. As is known, UDF was developed by the Optical Storage Technology Association (OSTA) and is the standard for optical media such as CD, CD-R, CD-R/RW, CD-ROM, DVD-ROM, DVD-R/RW, DVD-RAM, DVD+R/+RW and the like to provide file use and interaction between optical media and a plurality of operating systems. A more detailed description of the UDF file system is found in the UDF specification, which is incorporated herein by reference.

In order to ensure compatibility and interoperability with a plurality of operating systems and software applications, a UDF reader is placed on the media during format, in one embodiment of the present invention. For those systems that do not incorporate a UDF implementation, the UDF reader provides the necessary access and compatibility for use of the media. In one embodiment, the UDF reader is provided in an ISO9660 image at the start of the media. As is known, ISO9660 is a file system specification for CD optical media defining such things as volume and file structures, and is a widely accepted standard for CD optical media. Use of a UDF reader provides user access to the UDF image on the media for those systems without a previously defined UDF implementation.

A feature of the present invention is the ability to use the media upon completion of the formatting process, and before completion of the initialization of the entire media. In one embodiment, the formatting takes only two to four minutes. Although the remainder of the initialization of the media will continue in the background until complete, interaction with the media is enabled as soon as the two to four minutes of formatting has been accomplished. A user can interact with the media by reading, writing, executing, and the like while the present invention, in the background, initializes the media by writing initialization packets and then verifying the packets until the media space is initialized.

In order to provide for the use of the media, including the ability to eject the media from the optical media drive, a number of UDF structures are written to the media during format so they are in place before the media can be ejected. In addition to the UDF reader described above, fixed packets containing UDF file system structures are written to the media. Examples of UDF file system structures include volume structures such as the Volume Recognition Sequence (VRS), Anchor Volume Descriptor Pointer (AVDP), Primary and Reserved Volume Descriptor Sequences (VDS), Logical Volume Integrity Descriptor (LVID), and the like, as well as the sparing table and pre-initialized space for sparing packets. Additional structures, such as the Partition Descriptor (PD) and the Unallocated Space Bitmap (USB), are provided with their content adjusted to identify only the area of the media partition that is formatted. Enough space is reserved, however, to contain a full sized USB once the media has completed initialization. Similarly, the Free Space Table and Size Table in the Logical Volume Integrity Descriptor (LVID) are adjusted to reflect the initial partition size. These structures are configured to identify the media to other UDF implementations, and to signify that the uninitialized area beyond the end of the partition should be ignored.

Following the writing of volume structures, the partition format is initiated. During the partition format, a number of packets are initialized, based on the size of the media, to provide the user some initial media space in which to work. In one embodiment, these packets are configured to contain structures including at least the USB, a File Set Descriptor (FSD), and the root directory for the partition.

In addition to structures defined in the UDF, additional structures are written during formatting to enable initialization after formatting while the user may be interacting with the media, as well as to provide for the initialization to be paused, the media to be ejected, and for the initialization to be resumed upon remount of the media. The initialization can be resumed on any device implementing the present invention.

In one embodiment, an additional structure is an inventive Write Count Table (WCT). The inventive WCT is configured to track the progress of the initialization and of the verification of the packets on the RW media. One embodiment of the inventive WCT includes several entries in the table, with each entry corresponding to one packet on the RW media. By way of example, all uninitialized packets on the media are reflected in an entry in the WCT as the decimal value 15. This value indicates that the corresponding packet is not initialized and will only become initialized when it is first written to. Once initialized, the WCT entries corresponding to each packet take on the role of Defect Management. A packet initialized for the first time will, upon being written, have its WCT entry set to, by way of example, the value 0. A WCT entry of 0 prompts the program to re-read the just written packet to verify the integrity of the data. After the packet has been read and verified, its corresponding WCT entry is reset to, by way of example, the decimal value 10. From this point, each time the packet is written to, its corresponding WCT entry is decremented by one. Once the value reaches 0, the packet is verified, and its corresponding WCT entry is reset to the decimal value 10 to repeat the process.

Once all of the structures of the formatting operation have been written to the optical media, the structures are verified. Verification is accomplished using the created structures and known verification techniques. The verification process for formatting is distinct from the verification performed during initialization. Once the verification of the formatting sectors is complete, the formatting of the optical media is complete and the optical media is prepared for the initialization process. In one embodiment, the formatting process just described takes two to four minutes.

In operation 612, the user's request to access the media is allowed to continue. Once the media has been formatted, in operation 610, the media can accept content. Thus, the user's request to access the media is allowed to continue as originally requested. For example, when a user drags a file to an unformatted CD-RW, embodiments of the present invention first automatically format the CD-RW, then allow the file to be written to the newly formatted disc. In this manner, the user can utilize unformatted removable media in a manner similar to using previously prepared and formatted removable media.

Post process operations are performed in operation 612. Post process operations can include, for example, detecting new media in the drive, selecting a new format type, and other post process operations that will be apparent to those skilled in the art after a careful reading of the present disclosure. In addition to preparing media for content based on the drive type, media type, and media state, embodiments of the present invention can also base the format type on the type of content being written to the media.

Figure 7:
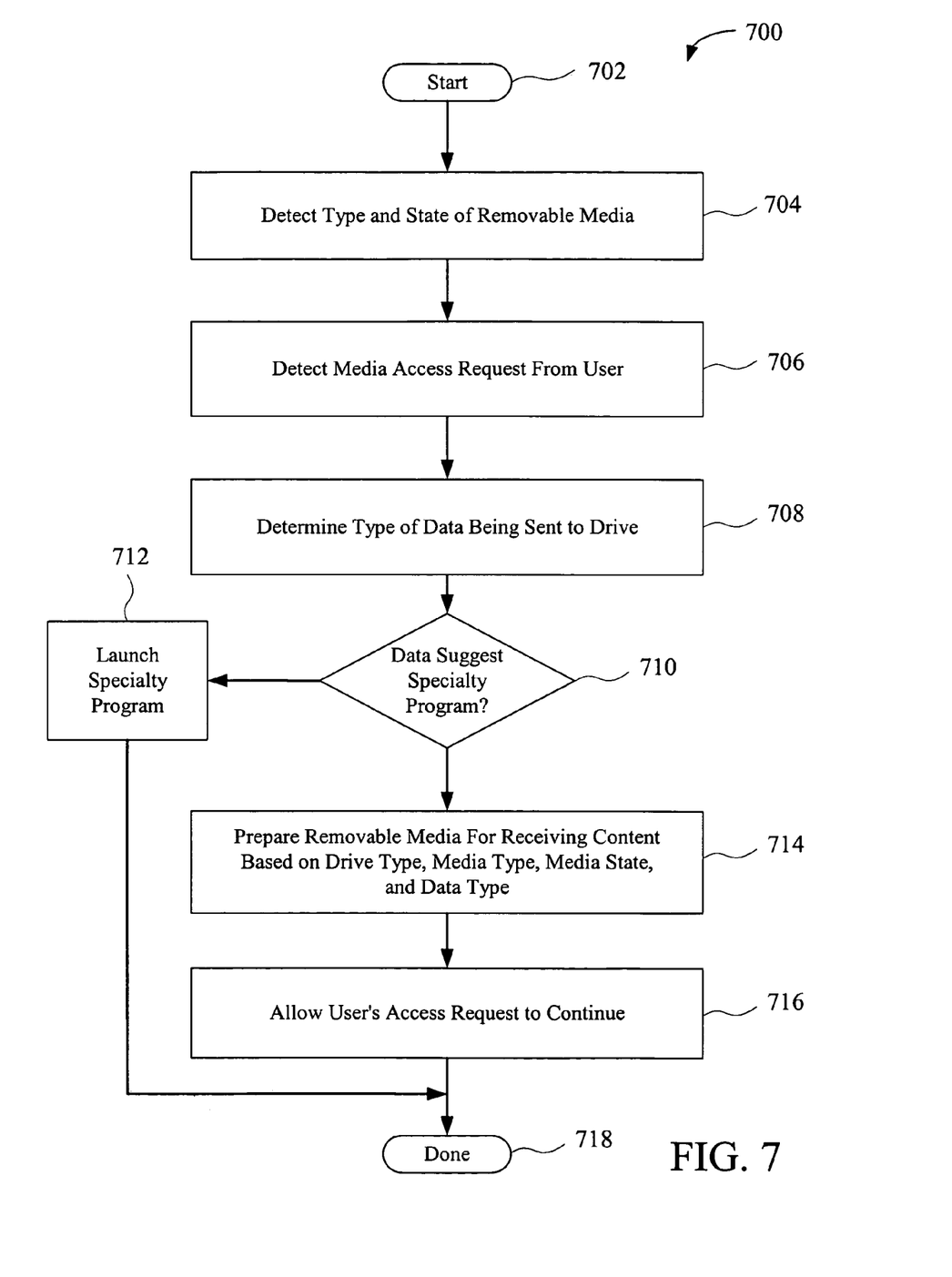
FIG. 7 is a flowchart showing a method for automatically preparing removable media for content based on content type, in accordance with an embodiment.

FIG. 7 is a flowchart showing a method 700 for automatically preparing removable media for content based on content type, in accordance with an embodiment of the present invention. In an initial operation 702, preprocess operations are performed. Preprocess operations can include, for example, determining the drive type of the drive containing the removable media, detecting the presence of new removable media in the drive, and other preprocess operations that will be apparent to those skilled in the art after a careful reading of the present disclosure.

In operation 706, a media access request from the user is detected. As mentioned previously, a user can request access to media using a plurality of different techniques. For example, the user can select a file to save to the media using the mouse cursor. Then, drag the icon representing the file to the window for the drive while keeping the mouse button depressed. Finally, the user releases the mouse button to save the file to the media. In addition, the user can select the icon representing the file and press the right mouse button. In this case, a menu will generally appear that allows the user to select from several different operations related to the selected file. One of these operations can be a "send to" operation, which allows a user to select a particular drive one which to write the selected file. As noted above, other exemplary file writing techniques include using a "windows explorer" program to transfer the file to the unformatted media, and "dragging" the file to a drive icon.

In operation 708, the type of data being sent to the drive is determined. Embodiments of the present invention can prepare media for content based on the data being saved on the media, as well as drive type and media type, as mentioned previously. Hence, in operation 708, the type of data being sent to the drive is determined and, based on the data type, additional media preparation can be performed. For example, when MP3 data is being sent to a drive having a CD, the user may be attempting to create a music CD.

A decision is then made as to whether the data being sent to the drive suggests a specialty program may be needed to prepare the media for content, in operation 710. As mentioned above, the type of data being sent to the media may indicate that a particular type of preparation may be more appropriate than other types of media preparation. In such cases, specialty programs may be available that are designed to prepare media for a particular type of content, such as music content. Hence, if the data being sent to the drive suggests a specialty program may be needed to prepare the media for content, the method 700 branches to operation 712. Otherwise the method continues with operation 714.

In operation 712, a specialty program is launched to prepare the media for content. For example, as mentioned above, when MP3 data is being sent to a drive having a CD, the user may be attempting to create a music CD. In this case, embodiments of the present invention can take appropriate actions to prepare the CD as a music CD. Here a music CD preparation program may be launched to allow the user to create a music CD that can be played on a CD player. Similarly, specialty programs can be launched based on video and image data types as well. For example, MPEG, AVI, RM, and other video data types can trigger the launch of a video CD and/or DVD preparation program. Likewise, JPEG, TIFF, GIF, and other image data file types can trigger the launch of photo album creation software that creates a photo album CD. In some embodiments, a dialog window can be opened that asks the user to confirm the preparation of the media using the specialty program.

In operation 714, the format type is determined for the removable media based on the drive type, media type, media state, and data type, and the media is prepared for content. As mentioned above, embodiments of the present invention can utilize several formatting types to format a particular removable media as described with reference to Tables 1–3. To reduce the amount of time required to format CD-RWs, embodiments can format CD-RWs using several techniques that reduce the formatting time. For example, in one embodiment a CD-RW can be formatted as a CD-R, by performing a sequential format. In this case, the formatting time for the CD-RW is about that of a CD-R. Although, the versatility of the CD-RW can be reduced when formatted in this manner, the timesavings can compensate the lost versatility for some users.

In operation 716, the user's request to access the media is allowed to continue. Once the media has been formatted, in operation 714, the media can accept content. Thus, the user's request to access the media is allowed to continue as originally requested. For example, when a user drags a file to an unformatted CD-RW, embodiments first automatically format the CD-RW, then allow the file to be written to the newly formatted disc. In this manner, the user can utilize unformatted removable media in a manner similar to using previously prepared and formatted removable media.

Post process operations are performed in operation 718. Post process operations can include, for example, detecting new media in the drive, selecting a new format type, and other post process operations that will be apparent to those skilled in the art after a careful reading of the present disclosure.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for automatically formatting removable media, comprising the operations of:

determining a drive type of a drive present on a computer system, the drive type defining characteristics of the drive;

detecting a media type of a removable media present in the drive, the media type defining characteristics of the removable media;

analyzing a request to write data to the removable media to determine a data type of the data, the data type defining characteristics of the data; and automatically preparing the removable media for content based on the drive type, media type, and the data type in response to receiving the request to write to the removable media, the automatically preparing the removable media including formatting of blank removable media and initialization of blank removable media as necessary without user configuration of the formatting.

2. A method as recited in claim 1, further comprising the operation of launching a specialty program to prepare the removable media for content.

3. A method as recited in claim 2, further comprising the operation of prompting a user for confirmation to launch the specialty program.

4. A method as recited in claim 2, wherein a music media creation specialty program is launched when the data type is a music file type.

5. A method as recited in claim 2, wherein a video media creation specialty program is launched when the data type is a video file type.

6. A method as recited in claim 2, wherein a photo album media creation specialty program is launched when the data type is an image file type.

7. A method as recited in claim 1, further comprising the operation of allowing the request to write to continue after preparing the removable media for content.

8. A method as recited in claim 1, wherein the removable media is a compact disc.

9. A method as recited in claim 1, wherein the removable media is a digital video disc.

* * * * *